United States Patent [19]

Teramachi

[11] 4,176,888
[45] Dec. 4, 1979

[54] LIMITED SLIDING BALL SPLINE ASSEMBLY

[76] Inventor: Hiroshi Teramachi, 2-34-8 Higashi-tamagawa Setagaya-ku, Tokyo, Japan

[21] Appl. No.: 819,285

[22] Filed: Jul. 27, 1977

[30] Foreign Application Priority Data

Aug. 18, 1976 [JP] Japan .................. 51-097774

[51] Int. Cl.$^2$ .................. F16C 31/04; F16D 3/06
[52] U.S. Cl. ............................. 308/6 R; 64/23.7
[58] Field of Search .............. 308/6 R, 6 A, 6 B, 6 C, 308/4 R; 64/23, 23.7

[56] References Cited

U.S. PATENT DOCUMENTS

| | | | |
|---|---|---|---|
| 2,787,144 | 4/1957 | Chauvel | 64/23 |
| 2,791,894 | 5/1957 | Duckworth | 64/23.7 |
| 3,800,558 | 4/1974 | Buthe et al. | 64/23.7 |

FOREIGN PATENT DOCUMENTS 2244075 3/1973 Fed. Rep. of Germany .......... 308/6 C

*Primary Examiner*—Charles E. Frankfort
*Attorney, Agent, or Firm*—Arthur T. Fattibene

[57] ABSTRACT

A limited sliding ball spline assembly having rectilinear motion in the axial direction and rotational motion to transmit torque individually or compoundly according to its purpose. The ball spline assembly has wide bearing surfaces with which balls contact in raceways by an outer sleeve and a shaft, thereby being able to transmit a large torque.

5 Claims, 7 Drawing Figures

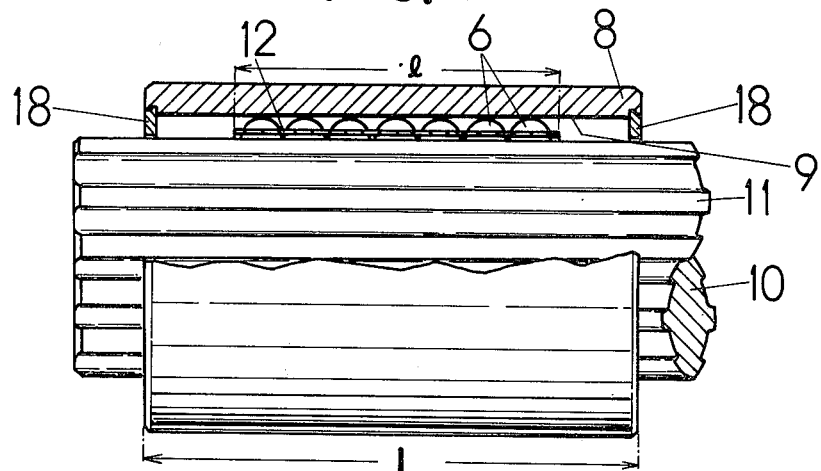
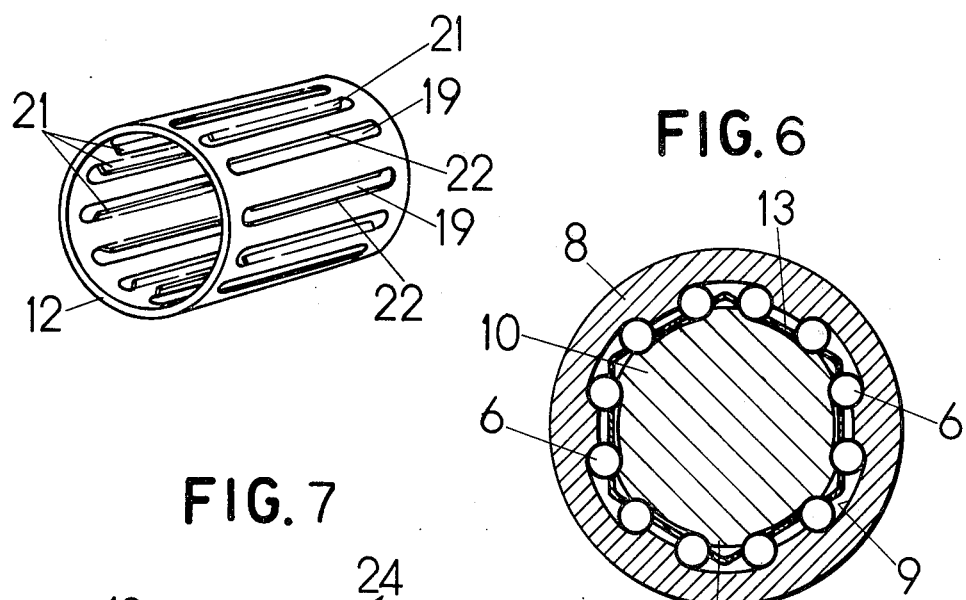
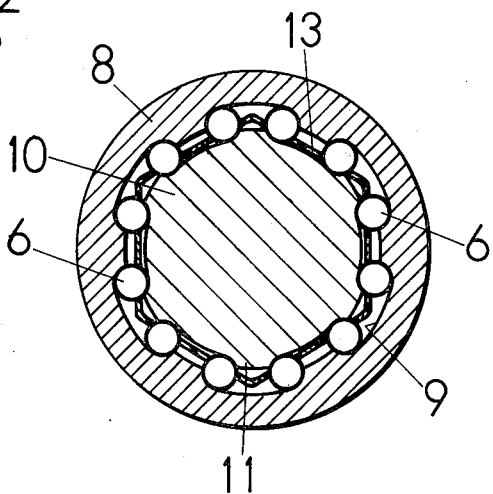
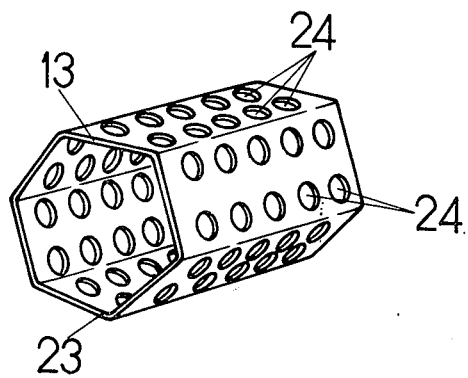

4,176,888

LIMITED SLIDING BALL SPLINE ASSEMBLY

BACKGROUND OF INVENTION

The present invention relates in general to an improvement of a limited sliding ball spline assembly, and, in particular, to the ball spline assembly capable of transmitting a large torque and obtaining a ball spline combination without any backlash.

Referring to FIG. 1, there is shown a conventional design of the limited sliding ball spline assembly. Such ball spline assembly comprises an outer sleeve 1 having a circular cross-section, the outer sleeve 1 being machined on the inside wall surface thereof to form plural parallel grooves 3, which extend substantially the entire length of the outer sleeve 1, a shaft 2 being inserted in the outer sleeve 1, the shaft being machined on the outside wall surface thereof to form plural parallel grooves 4, which extend substantially the entire length of the shaft 2, the parallel grooves 3 and 4 being opposite each other and forming plural rectilinear raceways for balls 6, and relative displacements in the rectilinear directions and transmission of torque between the outer sleeve 1 and the shaft 2 being carried through those balls 6.

However, in such conventional ball spline assembly, it is unavoidable that the distance between the inside wall surface of the outer sleeve 1 and the outside wall surface of the shaft 2 becomes relatively wide or large because there is inserted a ball retainer 5 therebetween, thus the bearing surfaces with which balls 6 contact in the raceways are very small and therefore it is not possible to transmit the large torque between the outer sleeve 1 and the shaft 2. For details, as shown in FIG. 1, the diameter of the ball retainer 5 must be smaller than the pitch diameter for setting the balls 6. When the shaft 2 rotates in the direction of the arrow A, the region in each groove 4 of the shaft 2 which contacts with the balls 6 and receives the contact pressure in the direction of rotation of the shaft 2 becomes the arc $a_1 b_1$ which is formed from the intersecting point $a_1$, which the imaginary line between the center of the ball 6 and the center axis of the shaft 2 crosses with the groove 4, to the end point $b_1$ of the groove 4, and this arc $a_1 b_1$ becomes smaller in consequence with the enlargement of the distance between the inside wall surface of the outer sleeve 1 and the outside wall surface of the shaft 2. Thereby it is unavoidable that the component $P_1$ of the contact pressure P in the direction of rotation becomes small.

SUMMARY OF THE INVENTION

In accordance with the present invention, the limited sliding ball spline assembly comprises an outer sleeve having a circular cross-section, a shaft being inserted in the outer sleeve, the outer sleeve being machined on the inside wall surface thereof to form plural wide U-shaped grooves for guiding balls which extend substantially the entire length of the outer sleeve, the shaft being provided on the outside wall surface thereof with projections which are positioned opposite to the grooves on the inside wall of the outer sleeve so as to form double rectilinear raceways for balls between one groove and both sides of one projection, balls retained by a ball retainer being inserted in the rectilinear raceways, each ball being contacted with the groove or one side of the projection in about 90° region of the ball arc thereby causing bearing surfaces in the raceways to enlarge considerably.

Accordingly, it is an object of the present invention to provide the limited sliding ball spline assembly capable of transmitting the large torque through the enlarged bearing surfaces in the raceways.

It is another object of the present invention to provide the limited sliding ball spline assembly capable of obtaining a ball spline combination without any backlash and setting up easily and accurately through selecting and combining of balls in each raceways.

The invention itself, as well as advantageous features thereof, will become apparent when reference is given to the following detailed description of preferred embodiments thereof, the detailed description referring to the appended drawings.

BRIEF DESCRIPTION OF THE DRAWINGS

In the drawings:

FIG. 4 is a longitudinal sectional view of FIG. 2;

FIG. 5 is a perspective view of the ball retainer of FIG. 2;

FIG. 6 is a sectional view of the limited sliding ball spline assembly according to another embodiment of the present invention; and FIG. 7 is a perspective view of the ball retainer of FIG. 6.

DESCRIPTION OF THE PREFERRED EMBODIMENTS

Figure 1:
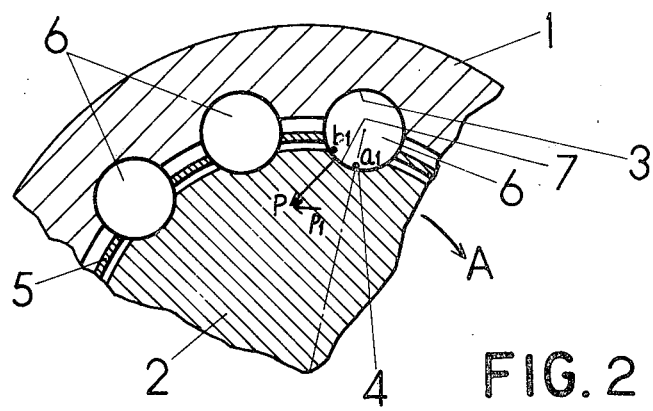
FIG. 1 is a fragmentary sectional view of the conventional limited sliding ball spline assembly.
Figure 2:
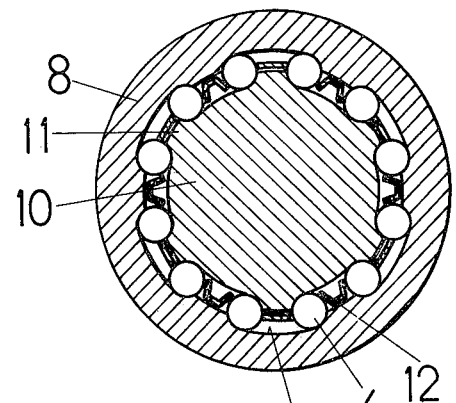
FIG. 2 is a sectional view of the limited sliding ball spline assembly according to one embodiment of the present invention.

Referring to FIGS. 2 through 5, there is shown the first embodiment of the limited sliding ball spline assembly according to the present invention. The ball spline assembly comprises an outer sleeve having a circular cross-section, a shaft 10 being inserted in the outer sleeve 8, plural balls 6 and a ball retainer 12 serving to retain the balls 6 inside the outer sleeve 8.

The outer sleeve 8 is machined on the inside wall surface thereof to form six wide U-shaped grooves 9 for guiding the balls 6 which extend substantially the entire length of the outer sleeve 8 and positions from space to space. The curvatures in both end portions of the grooves 9 in the outer sleeve 8 are equal to the curvature of the ball 6 respectively.

The shaft 10 is provided on the outside wall surface thereof with six projections 11 each positioned opposite to each groove 9 of the outer sleeve 8 so as to form double rectilinear raceways for the balls 6 between one groove 9 and the both sides of one projection 11, thereby forming four bearing surfaces 14, 15, 16 and 17.

The balls 6 retained by the ball retainer 12 are inserted in each double rectilinear raceway and contact with the four bearing surfaces on the outer sleeve 8 and the shaft 10, and each bearing surface 14, 15, 16 or 17 is contacted with the ball 6 in about 90° region thereof.

As can be seen from FIG. 4, the length L of the outer sleeve 8 is longer than the length l of the ball retainer 12, and, if both end portions of the outer sleeve 8 are closed by two side walls 18 respectively, the relative displacement between the outer sleeve 8 and the shaft 10 can be permitted within the distance $2(L-l)$.

As shown in FIG. 5, the ball retainer 12 comprises a thin walled cylinder 20 which is provided with same number of slots 19 as number of lines of balls 6, each slot 19 being provided along one side thereof with a rib 21, and balls 6 being retained, held, into each slot 19 by way of the rib 21 and another side portion 22 opposite to the rib 21.

Referring to FIGS. 6 and 7, there is shown another embodiment of the limited sliding ball spline assembly according to the present invention. This ball spline assembly is the same construction as the first embodiment with the exception of a ball retainer 13. The ball retainer 13 comprises a thin walled hexagonal cylinder 23 which is provided with same number of lines of holes 24 for balls 6 as number of lines of balls 6, and the diameter of each hole 23 being slightly smaller than the diameter of the ball 6, thereby retaining the balls 6 in the holes 23 respectively.

Figure 3:
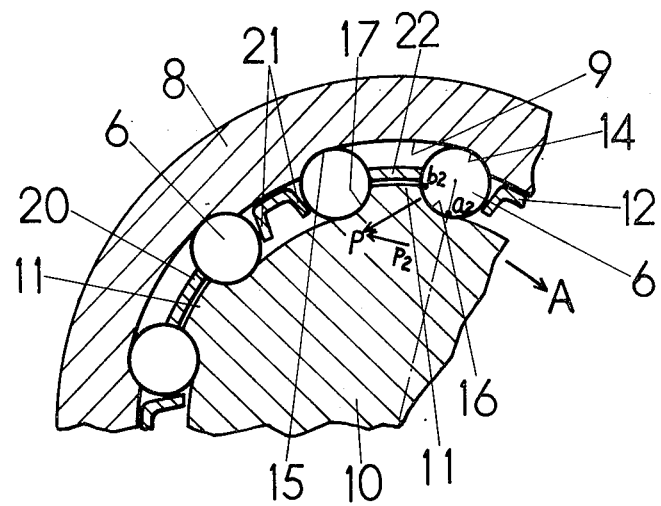
FIG. 3 is an enlarged fragmentary sectional view of FIG. 2.

In operation, when the shaft 2 rotates in the direction of the arrow A, as shown in FIG. 3, the bearing surface 16 of the shaft 10 becomes the arc $a_2 b_2$ which is formed from the intersectiong point $a_2$, which the imaginary line between the center of the ball 6 and the center axis of the shaft 2 crosses with the surface of the shaft 2, to the end point $b_2$. The arc $a_2 b_2$ becomes a large arc as substantially identical as a quarter circumference of the ball 6, since the diameter of the circle joining the top portions of the projections 11 is substantially the same as the pitch diameter for setting the balls 6. Accordingly, the bearing surface 16 of the shaft 10 is very wide in comparison with the conventional ball spline assembly, thus it is possible to transmit a large torque between the outer sleeve 8 and the shaft 10. This is ideal in the type of the ball spline assembly having the ball retainer. It is easily understood that the component $P_2$ of the contact pressure P in the direction of rotation becomes considerably larger than $P_1$ in the conventional ball spline assembly.

Additionally, in the ball spline embodied in this invention, it is possible to obtain the ball spline combination in the circumferential direction without any backlash because each projection 11 of the shaft 10 is provided on both sides thereof with the bearing surfaces 16 and 17 and it is possible to put the preload among the balls 6, the outer sleeve 8 and the shaft 10.

Furthermore, the advantage derived from the application of the ball retainer 12 or 13 make it easy to manufacture the ball spline assembly which has excellent performance and durability. As it is not possible to cut the grooves on the inside of the outer sleeve and to form the raceways for balls accurately, it is necessary to make the backlash zero, or to put the preload between the groove of the inside of the ready-made outer sleeve and the shaft, in order to produce the ball spline assembly which has excellent performance and durability. To complete such a mesh, however, it is necessary to select and combine balls in each raceway. As the ball spline assembly embodied in the present invention makes retention of the balls 6 inside the outer sleeve 8 possible, it is easy to select and combline the balls 6, as previously mentioned, and to produce the ball spline assembly which has excellent performance and durability.

Moreover, in the application of the ball retainer 12 as shown in FIG. 5, the ball spline assembly is possible to transmit the large torque because of the retention of many balls 6, and in the application of the ball retainer 13 as shown in FIG. 7, the ball spline assembly is possible to slide at high speed because of the separation of each ball 6.

What is claimed is:

1. A limited sliding ball spline assembly having an outer sleeve member, a shaft member disposed within said sleeve member and a coupling means including ball bearings for coupling said shaft member to said sleeve member for relative rectilinear movement in an axial direction and in relative torque transmitting relationship, the improvement comprising said shaft member and said sleeve member each having formed in their respective complementary inner and outer surfaces thereof a plurality of circumferentially spaced longitudinally extending grooves wherein said sleeve grooves and shaft grooves are sufficiently wide so as to accommodate two spaced apart adjacent rows of ball bearings of said coupling means, said respective sleeve grooves and shaft grooves having the sides thereof formed to complement a circumferential portion of the adjacent ball bearings, said shaft grooves being disposed in out of phased relationship to the sleeve grooves so that a side of a shaft groove and a side of the sleeve groove bear on opposite sides of a ball bearing common thereto, and a retainer disposed between said shaft member and said sleeve member, said retainer having a longitudinally extending rib for retaining the ball bearing in bearing relationship to the respective sides of the sleeve groove and shaft groove adjacent to said ball bearings and said retainer comprising a tubular member having a plurality of elongated slots formed therein, said slots being circumferentially spaced whereby adjacent slots define a pair of rectilinear raceways for containing a row of ball bearings; said rib being defined by said pair of rectilinear raceways having their adjacent edges bent out of the plane of said retainer whereby said row of ball bearings in each raceway is held within their respective raceway by said bent edge and the other edge of said respective raceways.

2. A limited sliding ball spline assembly as defined in claim 1 wherein said tubular member is cylindrical.

3. A limited sliding ball spline assembly as defined in claim 1 wherein said adjacent bent edges of said pair of rectilinear raceways are bent inward toward the shaft groove opposite thereto for maintaining the adjacent row of ball bearings in bearing relationship to the sides of the associated shaft groove.

4. A limited sliding ball spline assembly as defined in claim 1 wherein the bearing surface between each of said ball bearings and adjacent side of said shaft grooves define a contact arc of approximately 90°.

5. A limited sliding ball spline assembly as defined in claim 1 wherein said retainer comprises a regularly shaped polygonical tubular member, the number of sides of said tubular member being equal to the number of grooves formed in said sleeve member.

* * * * *